United States Patent
Takeyama

[11] Patent Number: 5,901,608
[45] Date of Patent: May 11, 1999

[54] AUTOMATIC SPEED-CHANGE APPARATUS FOR A GEAR TRANSMISSION

[75] Inventor: Eiji Takeyama, Nagoya, Japan

[73] Assignee: Aichi Kikai Kogyo Kabushiki Kaisha, Nagoya, Japan

[21] Appl. No.: 08/971,716

[22] Filed: Nov. 17, 1997

[51] Int. Cl.$^6$ ................................................. F16H 59/00
[52] U.S. Cl. ........................ 74/335; 74/473.12; 74/89.15
[58] Field of Search ............................... 74/335, 473.12, 74/89.15

[56] References Cited

U.S. PATENT DOCUMENTS

| | | | |
|---|---|---|---|
| 4,745,822 | 5/1988 | Trachman et al. | 74/335 |
| 4,790,204 | 12/1988 | Tury et al. | 74/473.12 X |
| 5,473,959 | 12/1995 | Lasoen | 74/335 |
| 5,689,997 | 11/1997 | Schaller | 74/335 |
| 5,704,251 | 1/1998 | Alber et al. | 74/335 X |
| 5,749,264 | 5/1998 | Broadbent | 74/335 |

*Primary Examiner*—Charles A. Marmor
*Assistant Examiner*—Marcus Charles
*Attorney, Agent, or Firm*—Dennison, Meserole, Pollack & Scheiner

[57] ABSTRACT

The object is to provide a speed-change apparatus wherein the automatic speed change of the conventional gear transmission can be satisfactorily performed by controlling a single motor and a single electromagnetic clutch. This apparatus includes a motor, an actuator gear, a select shaft having a select gear engaging with said actuator gear, a clutch, and a sleeve for moving in the axial direction; a shift gear engaging with said actuator gear, and a slider connected with said shift gear and connected with said sleeve through a slider bearing and further having a female screw engaging with a male screw on said select shaft. Said gears from said motor gear through said select gear have the gear ratios set identical to the gear ratios of said gears from said motor gear through said shift gear so that at the select operation, when said clutch is connected and said select shaft rotates, said slider may rotate without the axial movement; and at the shift operation, when said clutch is cut, said female screw may travel forward and reversely against said male screw, and said slider may move in the axial direction.

4 Claims, 3 Drawing Sheets

1·2        5
3·4

AUTOMATIC SPEED-CHANGE APPARATUS FOR A GEAR TRANSMISSION

BACKGROUND OF THE INVENTION

1. Field of the Invention

The present invention relates to an automatic speed-change apparatus for a gear transmission.

2. Description of the Prior Art

In the prior art, there is a speed-change apparatus in which the mechanism for the manual gear transmission is used as it is and the speed change and the clutch operation are automated through the hydraulic apparatus by the computer control. However, it requires three cylinders for clutch, shift and select, and a number of electromagnetic valves to actuate those cylinders and further requires a hydraulic system, so that it has such problems as complicated structure, large size and high cost.

Also, a speed-change apparatus in which motors are used as actuators to select or shift the gear transmission has been disclosed in JP publication Toku-ko-sho 61-51697, for example. However, in this apparatus the respective motors are used for the select and the shift mechanism, and a plurality of solenoids are used for the select mechanism. That is, this apparatus requires certain numbers of motors depending on the numbers of the select lines, and because of using a plurality of motors or solenoids, it results in a complicated structure and large size apparatus and further in high cost.

SUMMARY OF THE INVENTION

Accordingly, the present invention is originated in order to solve the above problems in the prior art, and an object of the invention is to provide an automatic speed-change apparatus for a gear transmission wherein the select operation can be performed by transferring the rotation of a motor to a select shaft so as to favorably rotate the select-shift rod of the gear transmission on its center axis and then the shift operation can be performed by changing the rotation of the motor into the axial movement of a slider and the select-shift rod connected with the slider by the engaging mechanism of a male and a female screw and through a slider bearing.

Another object of the invention is to provide an automatic speed-change apparatus for a gear transmission wherein the automatic speed change of the conventional gear transmission can be satisfactorily performed by controlling a single motor and a single electromagnetic clutch, so that it becomes possible to manufacture the apparatus in a simple structure, in a lightened and compacted condition and in low cost.

A further object of the invention is to provide an automatic speed-change apparatus for a gear transmission wherein it is very easy to control the apparatus by electric signals.

A still further object of the invention is to provide an automatic speed-change apparatus for a gear transmission wherein it becomes possible to endure high loads and to increase the moving speed of its slider so as to be superior in the durability and the responsibility.

Still another object of the invention is to provide an automatic speed-change apparatus for a gear transmission wherein it is possible to be free of the oil leak, to promote the lightened and compacted condition and to be free of the maintenance.

The subject matter of the invention is an automatic speed-change apparatus for a gear transmission having a select-shift rod extended out thereof; said gear transmission constituted so as to perform the select of the shift lines for a shift fork therein by rotating said select-shift rod on its center axis and then to complete the shift of gears by moving said select-shift rod in the axial direction to cause said shift fork to move subsequently; said automatic speed-change apparatus for performing the select and the shift operation through said select-shift rod, comprising; a select mechanism for performing the select operation; a shift mechanism for performing the shift operation; said select mechanism composed of a motor rotatable for forward and reverse, an intermediate shaft having an actuator gear for transferring the rotation of said motor, a select shaft having a select gear to be rotated by engaging with said actuator gear of said intermediate shaft, a clutch for cutting and connecting said select shaft and said select gear, and a sleeve fitted on the periphery of said select shaft for moving in the axial direction and connected with said select-shift rod of said gear transmission; said shift mechanism composed of a shift gear engaging with said actuator gear of said intermediate shaft for tranferring the rotation of said motor, and a slider connected with said shift gear at one end thereof and connected with said sleeve through a slider bearing at the other end thereof and further having a female screw engaging with a male screw fitted on the periphery of said select shaft; and said gears from said motor gear through said select gear having the gear ratios set identical to the gear ratios of said gears from said motor gear through said shift gear so that at the select operation, when said clutch is connected, even though said male screw on said select shaft rotates, said slider may rotate in the same direction at the same speed without axial movement, and on the other hand, at the shift operation, when said clutch is cut and said select gear idles, said female screw may travel forward and reversely against said male screw on said select shaft in the rest condition, and said slider may move in the axial direction as it rotates.

The second subject of the invention is that said clutch is composed of an electromagnetic clutch.

The third subject of the invention is that said male screw on said select shaft and said female screw of said slider engaging with said male screw are composed of trapezoidal multiple thread screws.

The fourth subject of the invention is that said select mechanism and said shift mechanism are constituted in a dry condition by using the gears, bearings, male screws, female screws or the like made of the materials and components requiring no oiling.

DESCRIPTION OF THE PREFERRED EMBODIMENT

With reference to the accompanying drawings, a preferred embodiment of the present invention will be described hereinafter.

Figure 1:
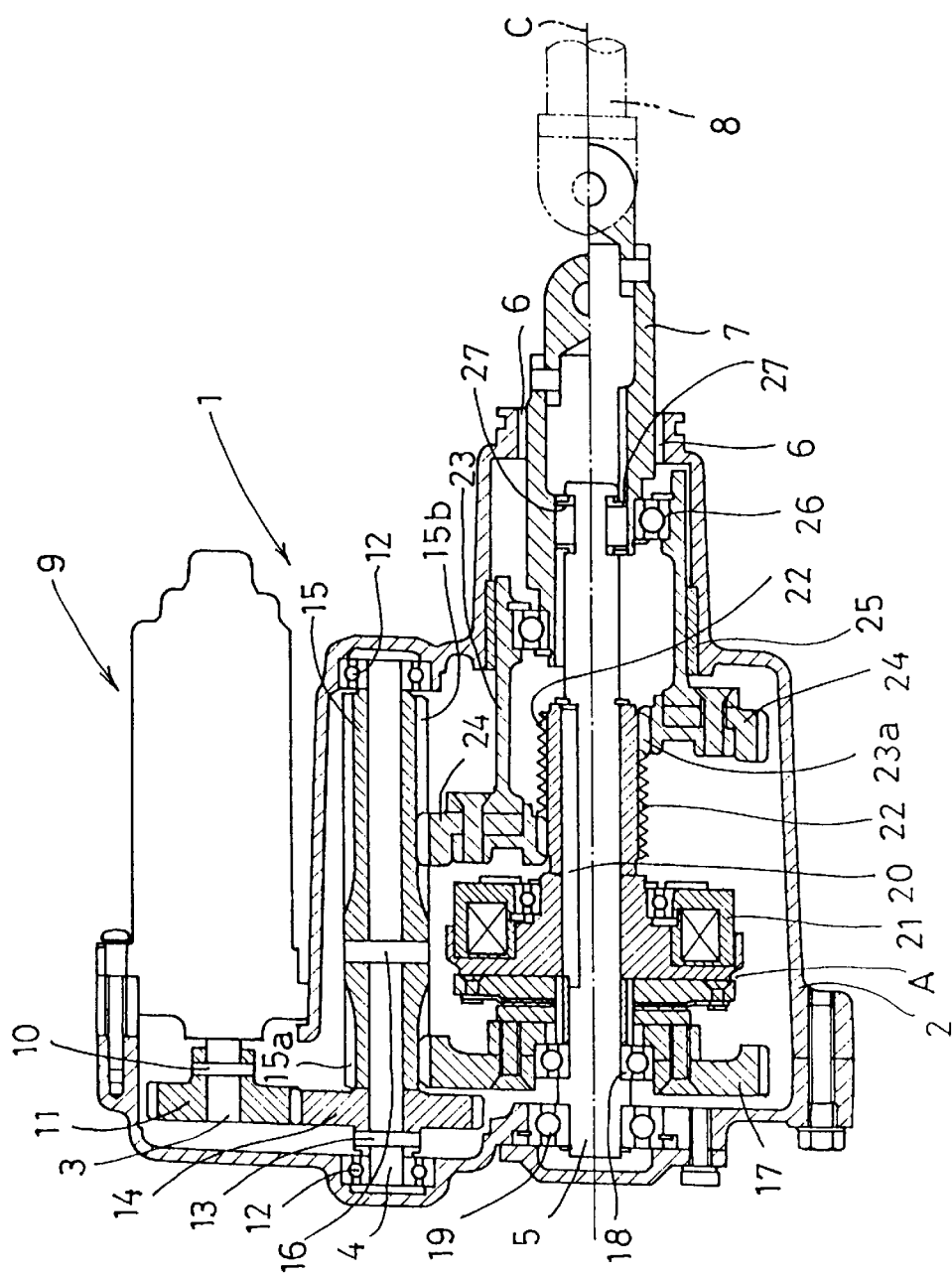
FIG. 1 is a sectional veiw of an automatic speed-change apparatus for performing the automatic speed change of a gear transmission.

FIG. 1 is a sectional veiw of an automatic speed-change apparatus to be connected to a conventional gear transmission (not shown). This automatic speed-change apparatus is originated in order to release the driver from the troublesome operation of the speed change in the gear transmission in the prior art. This automatic speed-change apparatus is connected with a select-shift rod extended out of the gear transmission and adapted to select the shifting lines in the gear transmission by rotating the select-shift rod 8 on its center axis and to automatically shift the gears in the gear transmission by moving the select-shift rod 8 in the axial direction.

Figure 2:
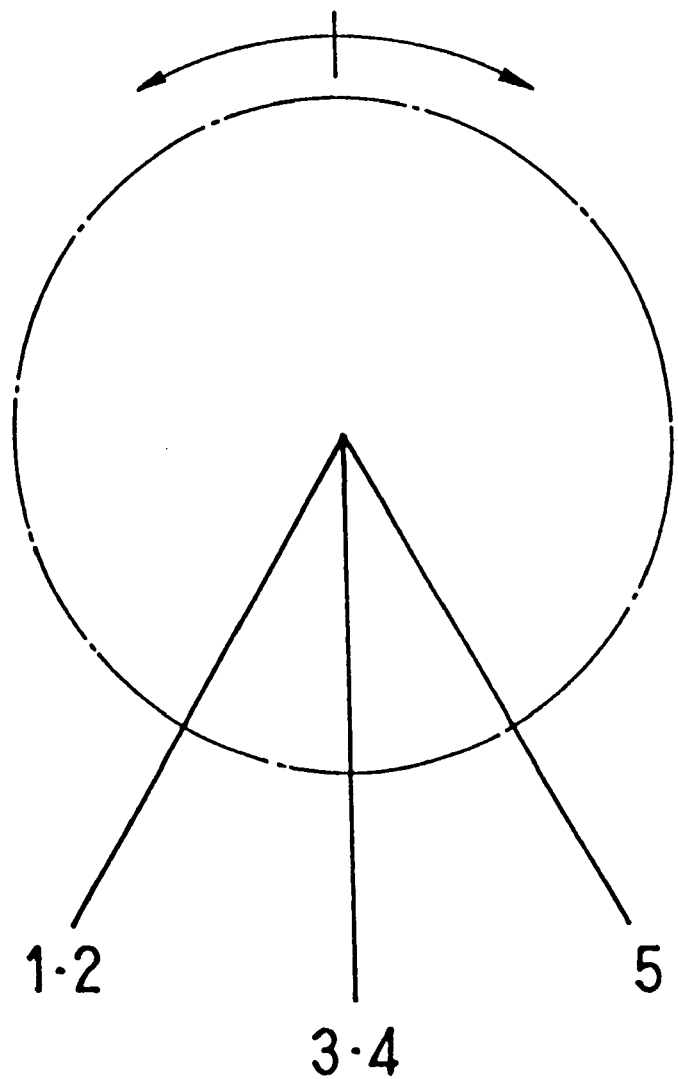
FIG. 2 is an illustrating diagram of the select operation.

Namely, in the conventional gear transmission (not shown), by rotating the extended select-shift rod 8 on its center axis, a select line is selected within the gear transmission, as shown in a diagram of the select operation of FIG. 2. As shown in FIG. 2, by rotating the select-shift rod 8 clockwise on its center axis the low or the second speed position can be selected, and also by rotating it counter-clockwise the fifth speed or R(reverse) position can be selected, and by putting it on the center shifting line the third or the fourth speed position can be selected.

After the shifting line in the transmission is selected as described above, by moving the select-shift rod 8 in the axial direction, the shift fork (not shown) in the transmission is subsequently moved, and the innner gear is shifted in the required low or second position, for example, as shown in a diagram of the shift pattern of FIG. 3. Thus, the speed-change operation can be completed. The select and shift mechanism for performing such a select and shift operation is incorporated in the automatic speed-change apparatus 1 as shown in FIG. 1.

In the automatic speed-change apparatus 1 in FIG. 1, a motor shaft 3, an intermediate shaft 4 and a select shaft 5 are disposed in parallel from upper to lower in an outside case 2. On the right end periphery of the select shaft 5, as shown in FIG. 1, is provided a sleeve 7 so as to be movable in the axial direction through a bearing 6 against the case 2. With this sleeve 7 is connected the select-shift rod 8 extended out of the conventional gear transmission described above.

The above-described motor shaft 3 is connected with a motor 9, which is rotatable for forward and reverse and controlled by a control apparatus (not shown). Also, the motor shaft 3 is fixedly provided with a motor gear 11 through a pin 10, and above-described intermediate shaft 4 is fixedly provided with an intermediate gear 14 through a pin 13, which intermediate gear 14 is engaged with the motor gear 11. This intermediate gear 14 is formed of the material of nylon resin. Also, in the right side of this intermediate gear 14, as shown in FIG. 1, an actuator gear 15 is provided on the intermediate shaft 4 through a pin 16. This actuator gear 15 is formed in an oblong shape; in the left side of the pin 16 is a left gear portion 15*a* and in the right side is a right gear portion 15*b*. Incidentally, this actuator gear 15 is formed of nylon resin, too. The intermediate shaft 4 is rotatably supported by bearings 12, 12 at both ends, each of which bearings is composed of a prelubricated ball bearing.

The select shaft 5 is supported at the left end by a bearing 19 and at the right end by the bearing 6 on the periphery of the sleeve 7 as described above. The bearing 19 is composed of a prelubricated ball bearing, and the bearing 6 is a plain bearing made of PTFE resin. On the periphery of this select shaft 5 is rotatably provided a select gear 17 through a bearing 18 composed of a prelubricated ball bearing. This select gear 17 is engaged with the left gear portion 15*a* of the actuator gear 15. This select gear 17 is formed of nylon resin, too.

Furthermore, on the right side of the select gear 17 is fixedly provided an electromagnetic clutch 21 on the periphery of the select shaft 5 through a key 20. This clutch 21 is electrically connected with a control apparatus (not shown). When the exciting current is turned ON by the control apparatus, the clutch 21 is connected with the select gear 17 at the clutch plate surface A, and thereby the select gear 17 can be firmly joined to the select shaft 5. In contrast with this, when the exciting current is turned OFF, the clutch plate surface A is separated, and the select gear 17 can idle around the select shaft 5 through the bearing 18. Moreover, on the right side of this electromagnetic clutch 21 is fixedly fitted a trapezoidal three start male screw 22 on the periphery of the select shaft 5 also through a key 20. This trapezoidal three start male screw 22 is formed of carbon steel. With the periphery of this trapezoidal three start male screw 22 is engaged a trapezoidal three start female screw 23*a* formed on the inner periphery of a slider 23. This trapezoidal three start female screw 23 is made of brass.

The slider 23 is stretched to the right in the figuer, and the inner periphery of the right end is connected with the left end of the sleeve 7 through a slider bearing 26. This slider bearing 26 is composed of a prelubricated ball bearing, too. Between this slider 23 and the outer case 2 lies a bearing 25, which is composed of a plain bearing made of PTFE resin. The slider gear 23 is connected on the left end with a shift gear 24 by means of screwing, which shift gear 24 is engaged with the right gear portion 15*b* of the actuator gear 15. This shift gear 24 is made of nylon resin, too.

Figure 3:
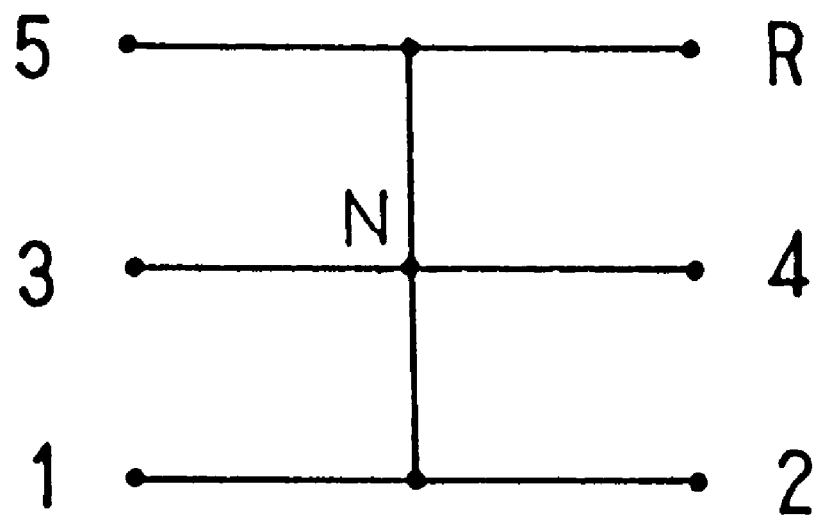
FIG. 3 is a diagram of the shift pattern.

Incidentally, in the upper side of the center line C of the select shaft 5 in FIG. 1, the slider 23 is illustrated in the condition travelled to the left side; it is on the low, the third or the fifth speed position as shown in FIG. 3. Also, in the lower side of the center line C, the slider 23 is illustrated in the condition travelled to the right side; it is on the second, the fourth speed or R(reverse) position as shown in FIG. 3.

The manner of the operation of the above-described speed-change apparatus 1 will be explained hereinafter. The select mechanism is constituted by the motor 9, motor gear 11, intermediate gear 14, actuator gear 15, select gear 17, electromagnetic clutch 21, select shaft 5 and sleeve 7. When the motor 9 is rotated, the rotation is transferred from the motor gear 11, through intermediate gear 14 and actuator gear 15 to select gear 17. At this time, when the electromagnetic clutch 21 is turned ON, the select gear 17 comes in the connected condition with the select shaft 5, the shaft 5 rotates, and receiving the rotating force from the slide gear 27 on the periphery of the select shaft 5, the sleeve 7 rotates. As a result, the select-shift rod 8 of the gear transmission connected with the sleeve 7 is selected on any select position as shown in FIG. 2. When the rotation of the motor 9 is reversed, the select-shift rod 8 can be rotated from the low or the second speed position to the third or the fourth speed position, and further to the fifth speed position. Incidentally, the slide key 27 supporting the sleeve 7 for moving in the axial direction is formed of polyimide resin.

Next, the shift mechanism is constituted by the motor 9, motor gear 11 for transferring the rotation of the motor 9, intermediate gear 14, actuator gear 15, shift gear 24 engaging with the actuator gear 15, slider 23 connected with this shift gear 24, trapezoidal three start female screw 23*a* on the inner periphery of the slider 23, trapezoidal three start male screw 22 on the periphery of the select shaft 5 and the slider bearing 26 for slidabley connecting the slider 23 and the sleeve 7. When the motor 9 is rotated, the rotation force is transferred from the motor gear 11, through intermediate gear 14 and actuator gear 15 to shift gear 24, and the slider 23 rotates. At this time, when the trapezoidal three start male screw 22 is in the rest condition, the trapezoidal three start female screw 23a travels along this trapezoidal three start male screw 22, and the slider 23 moves along the select shaft 5 in the axial direction as it rotates. As a result, the rotation is changed into the axial movement, the sleeve 7 is moved in the axial direction, accordingly the select-shift rod 8 is moved in the axial direction, and the shift fork (not shown) of the gear transmission is moved subsequently, so that the gear shift can be performed in the gear transmission.

In this embodiment, the gear ratios between the mutual gears from the motor gear 11, through intermediate gear 14 and actuator gear 15 to select gear 17 are set in the identical values respectively with the gear ratios between the mutual gears from the motor 9 through the motor gear 11, intermediate gear 14, actuator gear 15 to the shift gear 24. At the select operation, when the electromagnetic clutch 21 is connected, the select shaft 5 is rotated and thereby the trapezoidal three start male screw 22 is rotated. However, at this time, the slider 23 is rotated in the same direction at the same speed of the screw 22. Consequently, at the select operation, the slider 23 is rotated through the slider bearing 26 without axial movement. On the other hand, at the shift operation, the clutch 21 is cut, and thereby the select gear 17 comes to idle around the periphery of the select shaft 5 through the bearing 18 and the select shaft 5 keeps the rest condition. Consequently, the trapezoidal three start male screw 22, which is fixed on the periphery of the select shaft 5, also comes to keep the rest condition. Against this trapezoidal three start male screw 22 travels forward and reversely the trapezoidal three start female screw 23a on the inner periphery of the slider 23. As a result, the slider 23 comes to move in the axial direction as it rotates as described above.

Accordingly, in such an automatic speed-change apparatus 1, it is possible to satisfactorily performe the select and shift operations by controlling the rotation of the motor 9 for forward and reverse and by controlling the cut and joint of the electromagnetic clutch 21. Namely, when the electromagnetic clutch 21 is turned ON to come in the connected condition, the select shaft 5 comes to rotate, and when the clutch 21 is turned OFF to come in the separated condition, the select shaft 5 comes not to rotate. As a result, by using a single motor 9 and a single electromagnetic clutch 21 and by controlling them, it comes to be possible to automatically change speeds of the existing gear transmission. Further, as described above, since the automatic speed-change apparatus 1 can perform automtic speed change by controlling a single motor 9 and a single electromagnetic clutch 21, it comes to be possible to manufacture the apparatus in a simple structure and in easy control, to form the whole apparatus in a lightened and compacted condition and to reduce its cost.

Furthermore, since in the automatic speed-change apparatus is employed the electromagnetic clutch 21, it is very easy to control the apparatus by electric signals, and also, since the trapezoidal three start male screw 22 and the trapezoidal three start female screw 23a are employed, it comes to be possible that the apparatus 1 can endure high loads and can increase the moving speed of the slider 23.

Moreover, in the embodiment, the intermediate gera 14, actuator gear 15, select gear 17 and shift gear 24 are respectively formed of nylon resin. Also, the trapezoidal three start male screw 22 is formed of carbon steel and the trapezoidal three start female screw 23 is formed of brass. Also, the slide key 27 is formed of polyimide resin, the bearing 25 and the bearing 6 are made of PTFE resin, and the bearings 12, 19, 18, 26 are respectively composed of a prelubricated ball bearing. Namely, the whole apparatus is constituted in the dry condition by using the materials and components which are usuable without oiling, so that it is possible to be free of the oil leak, to promote the lightened and compacted condition and to be very easy of the maintenance.

What is claimed is:

1. An automatic speed-change apparatus for a gear transmission having a select-shift rod extended out thereof;

said gear transmission constituted so as to perform the select of the shift lines for a shift fork therein by rotating said select-shift rod on its center axis and then to complete the shift of gears by moving said select-shift rod in the axial direction to cause said shift fork to move subsequently;

said automatic speed-change apparatus for performing the select and the shift operation through said select-shift rod, comprising;

a select mechanism for performing the select operation;

a shift mechanism for performing the shift operation;

said select mechanism composed of a motor rotatable for forward and reverse, an intermediate shaft having an actuator gear for transferring the rotation of said motor, a select shaft having a select gear to be rotated by engaging with said actuator gear of said intermediate shaft, a clutch for cutting and connecting said select shaft and said select gear, and a sleeve fitted on the periphery of said select shaft for moving in the axial direction and connected with said select-shift rod of said gear transmission;

said shift mechanism composed of a shift gear engaging with said actuator gear of said intermediate shaft for tranferring the rotation of said motor, and a slider connected with said shift gear at one end thereof and connected with said sleeve through a slider bearing at the other end thereof and further having a female screw engaging with a male screw fitted on the periphery of said select shaft; and said gears from said motor gear through said select gear having the gear ratios set identical to the gear ratios of said gears from said motor gear through said shift gear so that at the select operation, when said clutch is connected, even though said male screw on said select shaft rotates, said slider may rotate in the same direction at the same speed without axial movement, and on the other hand, at the shift operation, when said clutch is cut and said select gear idles, said female screw may travel forward and reversely against said male screw on said select shaft in the rest condition, and said slider may move in the axial direction as it rotates.

2. An automatic speed-change apparatus for a gear transmission as defined in claim 1, wherein said clutch is composed of an electromagnetic clutch.

3. An automatic speed-change apparatus for a gear transmission as defined in claim 1, wherein said male screw on said select shaft and said female screw of said slider engaging with said male screw are composed of trapezoidal multiple thread screws.

4. An automatic speed-change apparatus for a gear transmission as defined in claim 1, wherein said select mechanism and said shift mechanism are constituted in a dry condition by using the gears, bearings, male screws, female screws or the like made of the materials and components requiring no oiling.

* * * * *